United States Patent [19]
Canter et al.

[11] Patent Number: 5,477,132
[45] Date of Patent: Dec. 19, 1995

[54] MULTI-SECTIONED POWER CONVERTER HAVING CURRENT-SHARING CONTROLLER

[75] Inventors: Stanley Canter, Phoenix, Ariz.; Ronald J. Lenk, Sunnyvale, Calif.

[73] Assignee: Space Systems/Loral, Inc., Palo Alto, Calif.

[21] Appl. No.: 278,939

[22] Filed: Jul. 22, 1994

Related U.S. Application Data

[63] Continuation-in-part of Ser. No. 192,186, Feb. 4, 1994, Pat. No. 5,359,280, which is a continuation of Ser. No. 818,842, Jan. 10, 1992, abandoned.

[51] Int. Cl.[6] .................................. G05F 1/62; H02J 7/04
[52] U.S. Cl. .................. 323/282; 323/222; 323/259; 323/906; 320/40; 363/65
[58] Field of Search ...................... 323/282, 283, 323/222, 224, 284, 285, 259, 263, 906; 363/16, 65; 320/30, 32, 39, 40

[56] References Cited

U.S. PATENT DOCUMENTS

| | | | |
|---|---|---|---|
| 4,347,474 | 8/1982 | Brooks et al. | 323/224 |
| 4,549,254 | 10/1985 | Kissel | 363/21 |
| 4,672,303 | 6/1987 | Newton | 323/285 |
| 4,729,088 | 3/1988 | Wong | 363/124 |
| 4,736,151 | 4/1988 | Dishner | 323/224 |
| 4,801,859 | 1/1989 | Dishner | 323/224 |
| 4,947,311 | 8/1990 | Peterson | 363/124 |
| 5,359,280 | 10/1994 | Canter et al. | 323/282 |

FOREIGN PATENT DOCUMENTS 2088159  11/1980  United Kingdom .

*Primary Examiner*—Peter S. Wong
*Assistant Examiner*—Adolf Berhane
*Attorney, Agent, or Firm*—Perman & Green

[57] ABSTRACT

An interleaved power converter is constructed so as to substantially equalize the power output of individual converter slices or phases. In an embodiment of the invention an interleaved power control system (110) includes a power bus (114) having a battery (116) coupled thereto and a plurality of slices (112) operating in a phased relationship with one another for causing the battery to source current to the power bus or to sink current from the power bus. Each of the slices includes an inductor (L) that is switchably coupled to the power bus and a controller (146) for controlling the switching of the inductor. The switching of the inductor is controlled as a function of (a) a difference between a magnitude of a voltage potential ($V_B$) of the power bus and a predetermined voltage potential magnitude (Voltage Setpoint); (b) a difference between a magnitude of a current flowing through the power bus ($I_T$) and a predetermined current magnitude (Charge Current Setpoint); and (c) a signal that indicates both of (i) a predetermined proportion of a total amount of current that the power converter system is supplying and, (ii) a magnitude of a peak current flowing through the inductor.

20 Claims, 9 Drawing Sheets

MULTI-SECTIONED POWER CONVERTER HAVING CURRENT-SHARING CONTROLLER

The invention described herein is a subject invention under U.S. government contract No. NAS3-25082, and as such the U.S. government may have rights therein.

CROSS-REFERENCE TO A RELATED PATENT APPLICATION

This patent application is a continuation-in-part of U.S. patent application Ser. No. 08/192,186, filed Feb. 4, 1994, now U.S. Pat. No. 5,359,280, issued Oct. 25, 1994, which is a continuation of U.S. patent application Ser. No. 07/818,842, filed Jan. 10, 1992 (abandoned).

FIELD OF THE INVENTION

The present invention relates to power systems. In particular, the present invention relates to an interleaved type of power converter.

BACKGROUND OF THE INVENTION

Power converters are well known and have been used to charge and discharge batteries. Examples of such power converters are disclosed in U.S. Pat. Nos. 4,347,474; 4,549,254; 4,672,303; 4,729,088; and 4,947,311.

Figure 1:
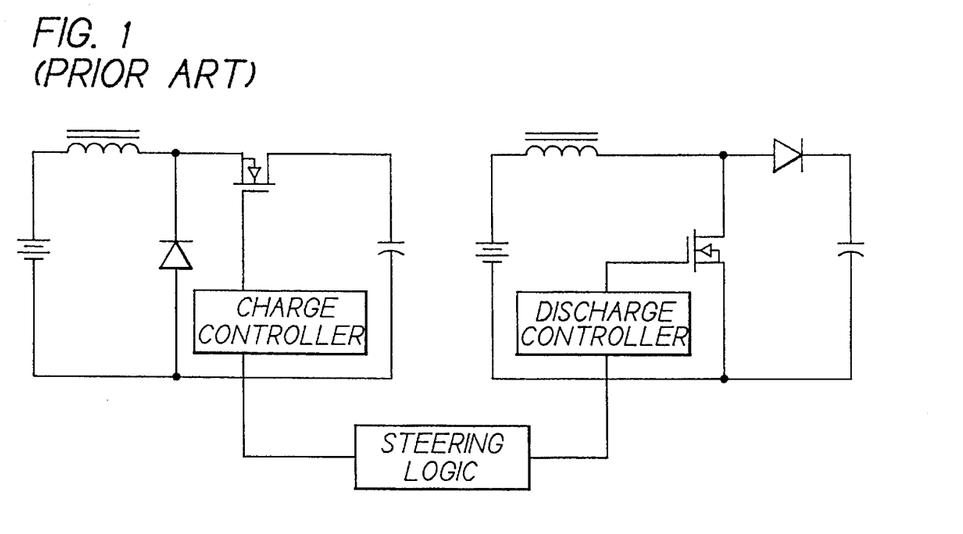
FIG. 1 is a block diagram of a prior art satellite power system.

FIG. 1 illustrates a battery charge/discharge configuration known in the prior art. The circuit of FIG. 1 includes separate circuits for charging and discharging the battery. The charge and discharge circuits each have their own controller. The interaction of the charge and discharge circuits is controlled by steering logic that is coupled to the charge controller and the discharge controller. A particular problem with the prior art is the need for this additional steering logic to control the operation of the charge and discharge circuits. The steering logic can be very complex and also is an area of possible instability due to the interaction between the charge and discharge circuits.

Another problem with the designs of the prior art is their weight. For converters used in satellites, weight is a primary consideration because of the tremendous launch and payload costs for spacecraft. The battery charge/discharge circuit of FIG. 1 is particularly a problem since separate circuits are required to perform the charging and discharging functions; thus, the power converters add to the weight of the satellite.

A further problem with the converters of the prior art is reliability. This problem is especially troublesome for power converters used in satellites, since the converters are not easily accessible once placed in operation. Thus, separate controlling circuits and complex steering logic are areas were the converters are likely to malfunction. This tends to reduced the reliability of the entire satellite.

U.S. Pat. Nos. 4,736,151 and 4,801,859 issued to Dischner disclose a bidirectional converter. These converters are designed to operate in an electrically-compensated constant speed drive. The control of the converter is not continuous. One switch is held off while the other switch is pulse width modulated. Additionally, the converter of Dischner produces a discontinuity at zero power flow that is detrimental to power charging/discharging systems. Thus, the converters of Dischner would not be generally suitable for satellite applications.

In the design of high power converters, for example 2 kilowatts or above, it is known to divide the power converter into a number, N, of identical sections, each processing a fraction $1/N$ of the total power. These individual sections are often referred to as slices, and the entire converter is then said to be interleaved. The slices are incorporated into an overall architecture which would include a multiple phase oscillator that outputs phases spaced at $360/N°$, a pulse width modulator, and a feedback control amplifier. The feedback control amplifier may contain one or more control loops. Because of the advantages in providing the combination of high performance with high stability margins, dual loop control or current mode control is increasingly becoming a standard design approach.

However, the inventors have determined that providing average current mode control in interleaved converters also requires that some mechanism be provided to prevent an individual slice or section from passing more than its normal share of the total converter power. The consequence of an unbalanced sharing of power is a decrease in efficiency, the possibility of overstressing individual components, and possible inductor saturation.

It should be noted that it is possible for the imbalance to arise from causative factors that are regenerative in nature. An example of such a factor is inductor saturation. That is, if one of the individual inductors is incrementally more susceptible to saturation than its counterparts, it will carry a larger share of the total current. This condition leads to increased saturation and still further current increases until some external factor or event establishes a current limit.

SUMMARY OF THE INVENTION

It is thus an object of this invention to provide an interleaved power converter that is constructed so as to substantially equalize the power output of individual converter slices.

It is another object of this invention to provide an interleaved power converter wherein each slice or phase contains a third feedback loop for regulating the current output by that slice or phase.

The foregoing and other problems are overcome and the objects of the invention are realized by a multi-sectional power converter constructed to have a converter controller in accordance with this invention. The power converter of this invention may be operated in and with a bilateral power converter of a type described in the above-identified commonly-assigned U.S. patent application Ser. No. 08/192,186, although it will also be shown below that the teaching of this invention may be applied to a wide range of power converter designs and architectures.

The teaching of the instant invention extends the previous teachings of the inventors to provide specific embodiments of a current mode controller having an inner, an outer, and a third feedback loop. The third feedback loop operates in parallel with the first two loops to control imbalances between power converter phases. The teaching of this invention also provides a voltage mode controller with a capability to control phase imbalances, but without changing the essential voltage mode dynamics, such as the two-pole response.

This invention teaches an interleaved power converter system comprising a power bus having a first node coupled to a source of power and a second node coupled to a load, and a plurality N of power converter slices connected in parallel with the power bus for providing current thereto. Each of the slices provides $1/N$ of a total amount of current flowing through the power bus. In accordance with this invention each of the slices comprises at least one switch coupled to the power bus and an inductance having a first terminal coupled to the at least one switch (coupled directly or indirectly, such as through a transformer) and a second terminal coupled to the power bus. A controller has an output for controlling the opening and closing of the at least one switch to control an amount of current that flows through the inductance. The pulse width of the output signal is controlled as a function of a difference between (a) a first signal that represents a magnitude of a voltage potential of the power bus and (b) a second signal that represents a combination of a magnitude of an average current flowing through the power bus and a magnitude of a peak current flowing through the inductance.

In an embodiment of this invention an interleaved power converter system includes a power bus having a battery coupled thereto and a plurality of slices operating in a phased relationship with one another for causing the battery to source current to the power bus or to sink current from the power bus. Each of the slices includes an inductor that is switchably coupled between a system ground and the power bus and a controller for controlling the switching of the inductor. The switching of the inductor is controlled as a function of (a) a difference between a magnitude of a voltage potential of the power bus and a predetermined voltage potential magnitude; (b) a difference between a magnitude of a current flowing through the power bus and a predetermined current magnitude; and (c) a signal that indicates both of (i) a predetermined proportion of a total amount of current that the power converter system is supplying and, (ii) a magnitude of a current flowing through the inductor.

DETAILED DESCRIPTION OF THE INVENTION

Before describing the present invention, a description is first made, with respect to FIGS. 2–5, of the bilateral power converter that is described in the above-identified U.S. patent application Ser. No. 08/192,186, now U.S. Pat. No. 5,359,280. It should be realized, however, that the teaching of this invention is not limited for use only with this particular type of power converter.

Figure 2:
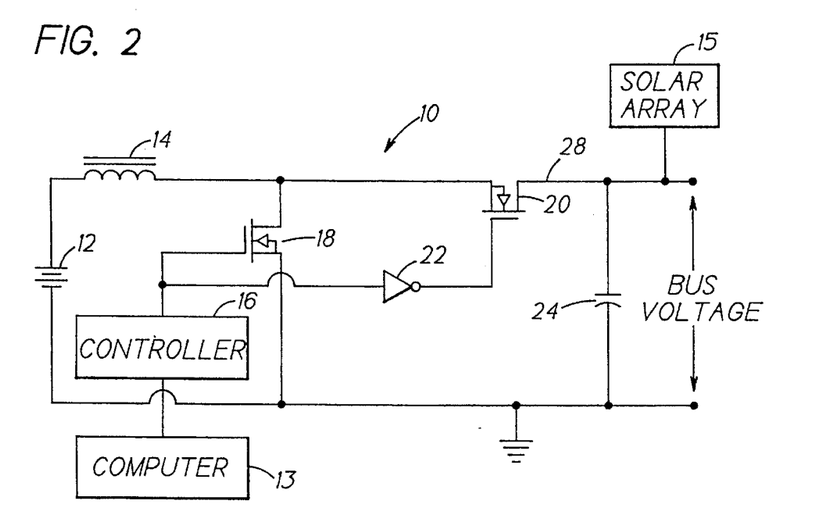
FIG. 2 is a block diagram of an embodiment of the bilateral power converter of the present invention for satellites.

Briefly, and referring to FIG. 2, this power converter for a satellite power system provides single set point control. An embodiment of this power system comprises a battery (12), an inductor (14), switches (18, 20), an inverter (22), and a controller (16). The battery (12) preferably has first and second terminals. The inductor (14) has a first and a second end, and the first end of the inductor (14) is coupled to the first terminal of the battery (12). The switches (18, 20) selectively couple the second end of the inductor (14) to a bus (28) or to ground in response to a control signal. The switches (18, 20) are thus coupled between the second end of the inductor (14), the bus (28) and ground. The controller (16) is preferably coupled to receive control signals from a computer (13) on board the satellite, and outputs a signal for controlling the switches (18, 20). The output of the controller (16) is also coupled to an inverter (22), whose output provides another signal for controlling the switches (18, 20).

The controller (16) monitors the bus (28) voltage, current flow to the battery (12), and the current flow through the switches (18, 20). The controller (16) also receives control signals from the satellite's computer (13) and automatically regulates the voltage on the bus (28) by adjusting the duty cycle of the signal output by the controller (16). Responsive to the duty cycle of the signal output by the controller (16), the bilateral converter (10) acts either as a buck converter, or as a boost converter to discharge or charge, respectively, the battery according to the amount of power on the bus (28).

In greater detail, the bilateral power converter 10 is especially useful in satellite power systems. In a typical satellite power system there are at least two sources of power. First, a solar array 15 is provided to convert radiant energy into electrical energy for use by the satellite. Second, a battery 12 powers the satellite when the solar array 15 does not generate sufficient power to satisfy the requirements of the satellite. The prior art conventionally uses separate power converters to couple the solar array 15 and the battery 12 together according to the amount of power generated by the solar array 15. Excess power from the solar array 15 is also used to charge the battery 12. In this embodiment the separate power converters are advantageously combined into a bilateral power converter for achieving significant weight savings and improved reliability. The bilateral power converter 10 attempts to maintain a power bus 28 of the satellite at a preset voltage by either sinking or sourcing current to or from the bus 28.

In FIG. 2 a simplified block diagram of an embodiment of a satellite power system is shown. The power system is preferably controlled in part by the satellite's computer 13. The bilateral converter 10 preferably comprises an inductor 14, a controller 16, a first switch 18, a second switch 20, an inverter 22 and a capacitor 24. The converter 10 is bilateral in that power can flow both to charge and discharge the battery 12. Thus, the converter 10 effectively either sinks or sources power to the bus 28 in response to signals from the controller 16.

The battery 12 has a first terminal and a second terminal. The first terminal is preferably coupled to a first end of the inductor 14. The second terminal provides ground. The first switch 18 is preferably coupled between the second terminal of the battery 12 and a second end of the inductor 14. Thus, when the first switch 18 is in a closed position, the current through the inductor 14 increases in the direction of the bus 28. The capacitor 24 also has one end coupled to the second terminal of the battery 12. The second switch 20 is coupled between the second end of the inductor 14 and the other end of the capacitor 24. Thus, when the second switch 20 is in a closed position, the current through inductor 14 is increasing in the direction of the battery 12. Therefore, in accordance with the voltage level of the battery 12 and bus 28, and by varying the duty cycle of the control signal received by the first and second switches 18, 20, the battery 12 will either be charged or discharged.

In this embodiment the power converter advantageously uses a single control signal to control the closing of the first and second switches 18, 20. The control signal output by the controller 16 is coupled to activate the first switch 18. The same control signal is also coupled through inverter 22 to activate the second switch 20. The use of a single signal to control the first and second switches 18, 20 advantageously eliminates a requirement for redundant control logic required by the prior art. Since the first and second switches 18, 20 are activated by control signals that are the inverse of each other, only one of the switches 18, 20 will remain closed at any particular instant.

Thus, the power converter illustrated in FIG. 2 also eliminates the need for steering logic as required by the prior art device of FIG. 1.

Figure 3:
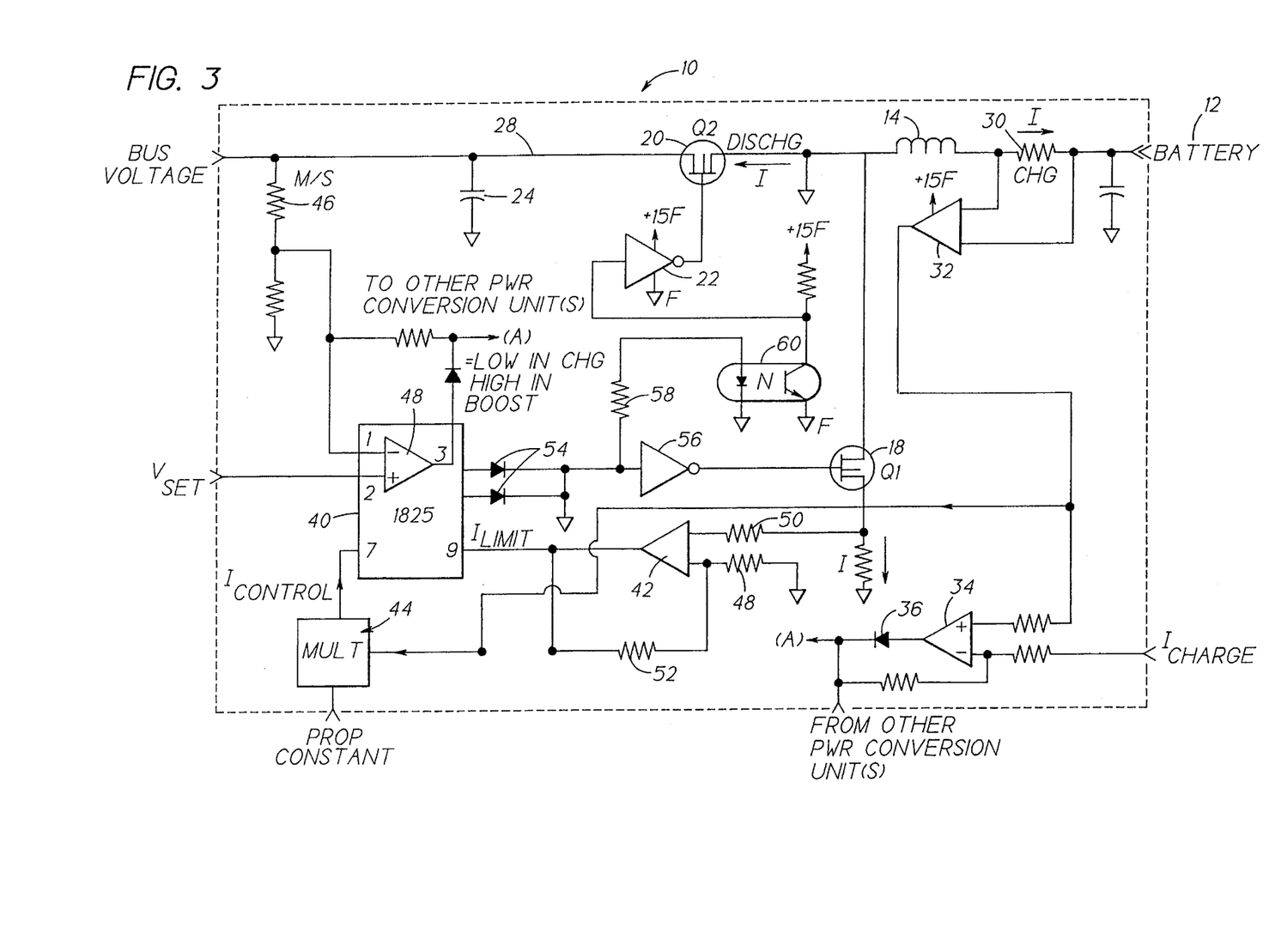
FIG. 3 is a schematic diagram of the embodiment of the bilateral power converter of the present invention.

Referring now to FIG. 3, a schematic diagram of the embodiment for the bilateral converter 10 is shown. The first switch 18 couples one end of the inductor 14 to ground. The second switch 20 is coupled between the same end of inductor 14 and the bus 28. The other end of the inductor 14 is coupled through a resistor 30 to the battery 12. The two ends of the resistor 30 are coupled to separate inputs of a differential amplifier 32 to produce a signal indicating how much current is flowing to the battery 12. The output of amplifier 32 is coupled to an input of amplifier 34. The other input of amplifier 34 is coupled to receive the Icharge signal. The Icharge signal is a signal produced by the computer 13 of the satellite and indicates the desired charge rate for the battery 12. The Icharge signal also allows the computer 13 to control the amount of charge that the battery 12 will receive based on its charge state and other factors such as the battery's age. Operational amplifier 34 compares the Icharge signal to the amount of current sent to the battery 12 as indicated by the output of amplifier 32. The output of amplifier 34 is then coupled to node A (the controller 16) by a diode 36 to control the amount of charging current that is provided to the battery 12. It should be understood that a plurality of such bilateral converter circuits (BCDU2, BCDU3) may be coupled together to regulate the power between a solar array 15 and several batteries. Thus, the cathode of the diode 36 is preferably coupled to receive signals from other converters (BCDU2, BCDU3).

In the embodiment of FIG. 3, the controller 16 preferably comprises a multiplier circuit 44 and a pulsewidth modulator 40 including an operational amplifier 42. The pulsewidth modulator 40 has a first control input that is coupled to receive the Vset signal. The Vset signal is a voltage provided by the computer 13 to regulate the bus 28 independent of whether the battery 12 is being discharged or charged. The pulsewidth modulator 40 has a second control input coupled to the bus 28 by a resistor 46. The pulsewidth modulator 40 includes an operational amplifier 48 that compares the vset signal and the bus 28 voltage to regulate the output of the pulsewidth modulator 40. The output of the amplifier 48 is preferably coupled by a diode to node A and, thus, provides a feedback loop for amplifier 48.

The pulsewidth modulator 40 also receives an input from the multiplier circuit 44. The multiplier circuit 44 preferably has two inputs. The first input is coupled to receive a proportionality constant signal from the satellite's computer 13. The proportionality constant signal is used by the computer 13 to regulate the percentage of the total power that each bilateral converter 10 can deliver or receive. For example, the proportionality constant may be varied such that one BCDU (Battery Charging Discharging Unit) may deliver 50% of the power while two other BCDUs each deliver 25% of the power. The other input to the multiplier circuit 44 is provided by the output of amplifier 42 that provides a signal indicative of the amount of current passing through the first switch 18, and thus through this particular bilateral converter or BCDU. The multiplier circuit 44 multiplies the signal output by amplifier 42 by the proportionality constant signal and sends the product to the pulsewidth modulator 40 in order to set the ratio control of current to the battery 12 relative to the other converters.

The pulsewidth modulator 40 is also coupled to receive the output of amplifier 42. As noted above, amplifier 42 operates to generate a current limit signal. A first input of the amplifier 42 is coupled to ground through a resistor 48. The first input of amplifier 42 is also coupled to the output of amplifier 42 by resistor 52. A second input of the amplifier 42 is coupled to by a resistor 50 to an end of the first switch 18.

The output of the pulsewidth modulator 40 is used to control the closing of the first and second switches 18, 20. In the exemplary embodiment of FIG. 3, two outputs of the pulsewidth modulator 40 are coupled to diodes 54 and "OR" together to provide a signal with a wider range of duty cycle. The outputs of the diodes 54 are coupled through an inverter 56 to the control input of the first switch 18. Similarly, outputs of the diodes 54 are coupled through a resistor 58, an optical coupling device 60, and inverter 22 to the control input of the second switch 20. In the illustrated embodiment, the first and second switches 18, 20 are field effect transistors. Since the first and second switches 18, 20 are controlled by a single control signal and its inverse, the switches 18, 20 must be one of two possible states. In the first state, the first switch 18 is open and the second switch 20 is closed, and an electrical path through the second switch 20 allows current to flow from the bus 28 through the inductor 14 to the battery 12, or vice versa. In the second state, the first switch 18 is closed and the second switch 20 is open, which disconnects the bus 28 from the inductor 14 and couples one end of the inductor 14 to ground through a resistor.

The pulsewidth modulator 40 varies the duty cycle of its output signal according to the input signals received. Depending on the duty cycle output by the pulsewidth modulator 40, the bilateral converter acts 10 as either a boost converter or a buck converter and, thus, can drive power in both directions. For example, if the power provided by the solar array 15 on bus 28 is adequate to drive the satellite's system loads as well as charge the battery 12, then the error amplifier 48 will be driven into saturation. The battery charging current will be controlled by the programmed value by limiting the error amplifier 48 excursion by current sense amplifier 34. On the other hand, if no power is provided by the solar array 15, the satellite's system load demand exceeds the power produced by the array, or not enough charge is provided to charge at the charge set point, then charging is automatically reduced until the charge goes to zero and the battery 12 begins sourcing the bus 28. This operation is advantageous since the converter 10 continuously regulates the bus voltage by adjusting the duty cycle output by the pulsewidth modulator 40, independent of the mode in which the converter 10 is operating.

Figure 4:
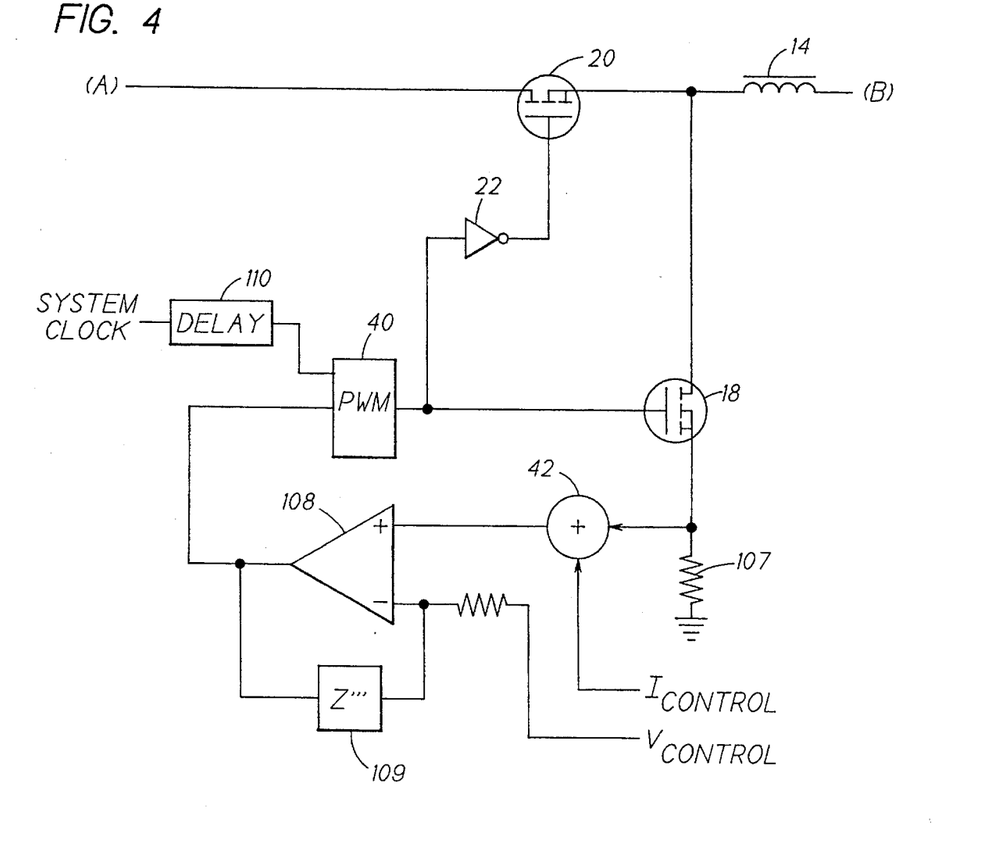
FIG. 4 is a schematic diagram of a further embodiment of an inner or third control loop which may be incorporated into the bilateral power converter system.
Figure 5:
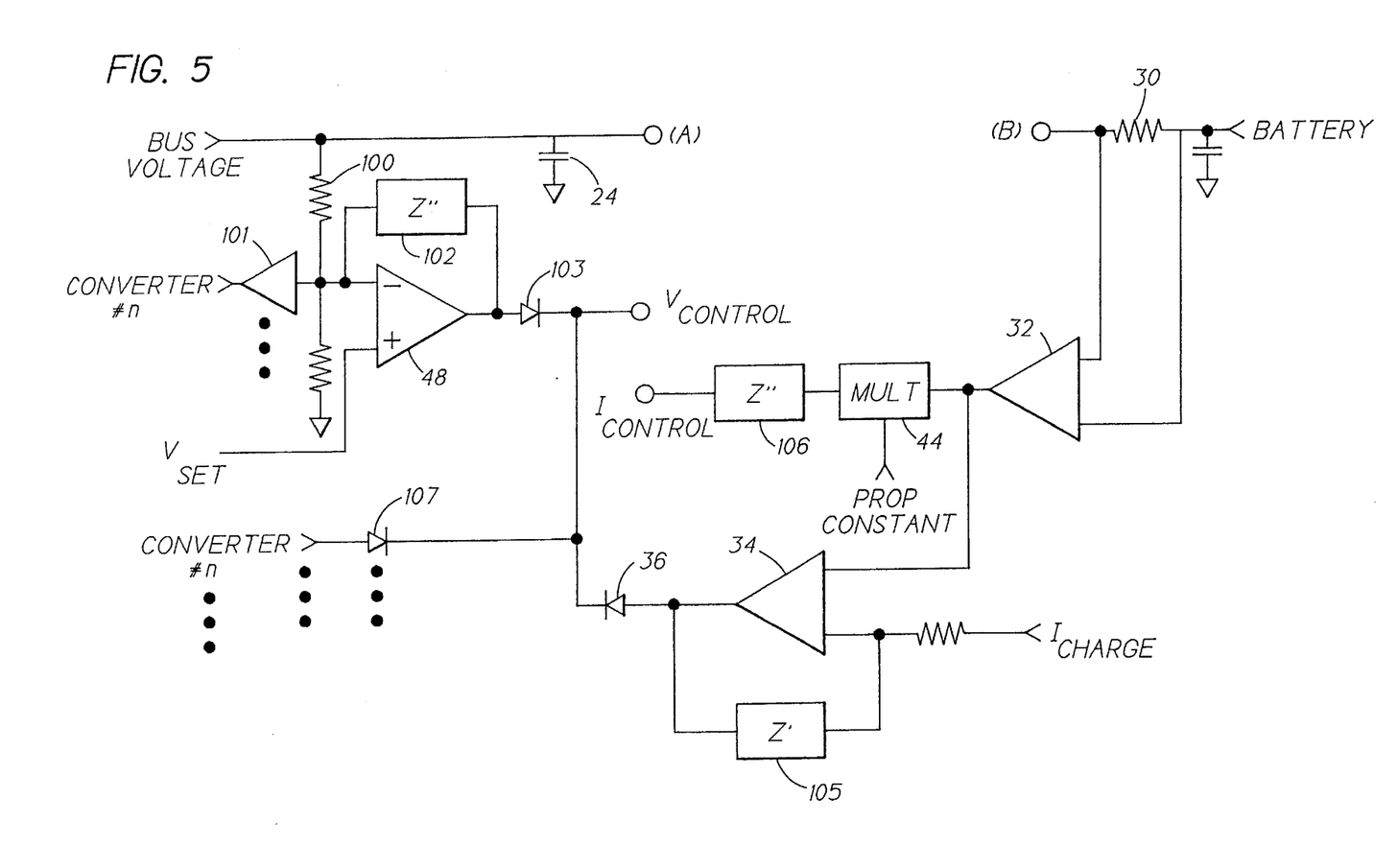
FIG. 5 is a schematic diagram of an embodiment of an outer control loop which may be incorporated into the bilateral power converter system.

In the embodiment of FIG. 5, the depicted elements appear once in the converter, the elements of the embodiment of FIG. 4 being attached in one or more embodiments all together at the nodes shown in FIG. 5.

In the embodiment of FIG. 5, the outer, voltage control loop contains a resistor divider network 100, a plurality of buffers 101 to communicate the signal generated by divider network 100 to all other converters in the system, and an amplifier 48. The amplifier has a first control input that is coupled to receive a Vset signal. The Vset signal is a voltage provided by the computer (not shown) to regulate the bus 28 voltage. The amplifier 48 has a second input coupled to the bus by the resistor divider network 100. The amplifier has feedback 102 to control the frequency characteristics of the bus control.

The voltage control loop also includes a diode 103 to determine which of the various signals attached to the node Vcontrol will control the duty cycle. The loop also contains a plurality of control inputs, one for each other converter in the system. Each of these is coupled to the node Vcontrol through a diode, such as 104 in the Figure, with which they are connected in a manner that the highest signal controls the duty cycle.

In the embodiment of FIG. 5, the outer, current limiting control loop contains a resistor 30 to sense total current into or out of the battery. The common-mode voltage of this signal is removed by amplifier 32, which also amplifies the signal. Amplifier 32 has an input from node (B), connected to the nodes (B) represented in FIG. 4, and a second input from the battery.

The output of amplifier 32 is one input to amplifier 34. Amplifier 34 has a second input, which is a voltage provided by the computer (not shown) to limit the maximum charge current into the battery. Amplifier 34 also has feedback 105 to control the frequency characteristics of the current control loop, and a diode 36 to Couple it to the node Vcontrol, with which it is connected in a manner that the highest signal controls the duty cycle.

The embodiment FIG. 5 also shows a portion of the inner, high-frequency total current loop. The output of the amplifier 32 is connected to one input of a multiplier 44. The other input of the multiplier is connected to a Proportionality constant signal. The proportionality constant signal is a voltage provided by the computer (not shown) to determine the ratios of currents being provided to or from the battery attached to each converter (the batteries need not be each of the same voltage). The output of the multiplier 44 is attached to a (possibly active) filter network 106, which shapes the frequency characteristics of the inner control loop signal provided at the node Icontrol to the rest of the inner control loops represented in FIG. 4.

In the embodiment of FIG. 4, which may be repeated multiple times within a converter, a first switch 20 is connected to the node (A) of FIG. 5. It is also connected to an inductor 14, and to a second switch 18. Switch 18 is connected via a current sensing resistor 107 to ground. The inductor 14 is also connected to the node (B) of FIG. 5.

The current sensed in resistor 107 is a peak-current. It is added in adder 42 to the total current control voltage Icontrol, produced on FIG. 5. In this embodiment, the peak current would be about 5% of the amplitude of the total current. The addition of the peak current to the total current ensures that each occurrence of the FIG. 4 within the converter will take an equal share of the total current of the converter. This aspect of the invention is developed in further detail below, and is shown to be applicable to a wide range of power converter topologies.

The output of the adder 42 is connected to one input of the amplifier 108. A second input to amplifier 108 is connected to the node Vcontrol, which is generated on FIG. 5, and is the outer control loop signal controlling the inner loop. The amplifier 108 also has a feedback 109 which controls the frequency characteristics of the inner control loop. The output of the amplifier 108 is one input to the pulse-width modulator 40, which converts its input signals into a duty cycle.

The other input to the pwm 40 is for the system clock, through a delay 110. The delay is different for each example of FIG. 4 included within the converter, the delay serving to stagger the units to reduce input and output ripples of the converter. The delayed system clock acts to initiate the duty cycle of the pwm 40. The output of the pulse-width modulator 40 is a duty cycle modulated signal used to control the two switches, 18 and 20, Switch 18 is controlled directly by the pwm 40, whereas switch 20 is controlled by the inverted signal from the pwm, the inversion being accomplished by inverter 22. Inverter 22 also acts to convert the drive signal to the appropriate voltage level for switch 20.

Having thus described embodiments of bilateral power converters as taught by U.S. Pat. No. 5,359,280, a description of the interleaved, multi-section power converter controller of the present invention is now made with respect to FIGS. 6, 7A and 7B.

The teaching of this invention grows from a realization by the inventors that if the comparator of the PWM is moved to the individual slice function, and if the comparator is provided with a signal that is representative of either the inductor or switch current of that slice, which is then either added to the average of the inductor currents in a current mode control loop, or added to the oscillator ramp in a voltage mode controller, and further if the resulting signal is compared to the output of the voltage error loop, then the imbalance in circuit parameters in an interleaved converter is accounted for and, beneficially, any current imbalance between phases is substantially eliminated.

This occurs because the slice or phase outputting a higher current will terminate its pulse width prematurely, while a phase outputting a lower current will have its conduction period extended; thus a restorative force is generated which tends to balance the individual phase currents.

It is important to note that while this may at first appear to be only a further application of current mode control, the approach of this invention is in fact distinctly different. Firstly, when applied to a current mode controller the teaching of this invention adds a third distinct feedback loop to the current and voltage loops. The third distinct feedback loop functions only to control imbalances between phases. Secondly, when the teaching of this invention is applied to voltage mode controllers the phase imbalance is controlled, but the essential voltage mode dynamics, i.e., the two pole response, is not effected.

In accordance with an aspect of this invention the advantages of average current mode control are retained, while adding in a small portion (e.g., 5%) of the peak current supplied by each slice.

Figure 6:
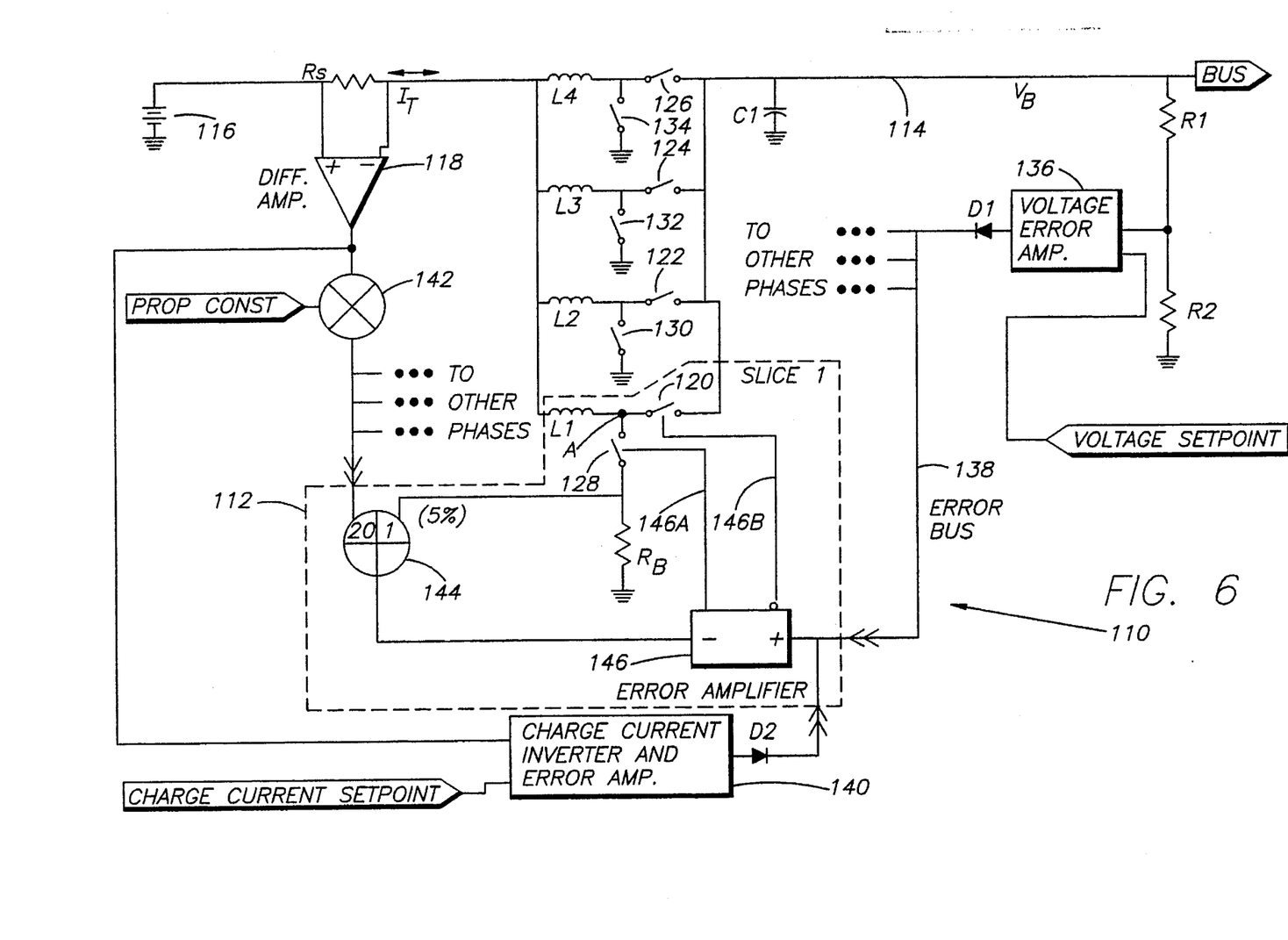
FIG. 6 is a schematic diagram, partly in block diagram form, of a presently preferred current-sharing controller for use in a multi-sectioned power converter.

Reference is now made to FIG. 6 for illustrating an embodiment of the teaching of this invention. A four phase or slice interleaved power converter 110 includes a first section that is common to all slices and a plurality of second sections each of which represents one slice. FIG. 6 shows one of the slices 112 which is enclosed within dashed lines.

The converter 110 includes a power bus 114 that is coupled between a battery 116 and other components, including at least one solar array panel (not shown). A current sensing resistor $R_S$ is connected in series with the bus 114. An amplifier 118 is connected across the current sensing resistor and provides an indication of the total current ($I_T$) that is flowing to or from the battery 116. Switchably connected to the bus 114 are a plurality of parallel-connected inductors (L1–L4) and associated buck transistors 120–126 and boost transistors 128–134. Each of the inductors and its boost/buck transistor pair are associated with and controlled by one of the slices. In FIG. 6 only the slice 112 is shown as being connected to the boost and buck transistors 128 and 120. It should be realized that the three unillustrated slices are each connected to an associated one of the inductors and boost/buck transistor pairs in the same manner.

Also connected to the bus 114 is a conventional filter capacitor C1 and, through a voltage divider (R1/R2), a voltage error amplifier 136. The voltage error amplifier 136 functions to develop an error voltage output that reflects the difference between the bus voltage ($V_B$) and a voltage set point value that is provided by an external controller, such the computer 13. The error voltage output from the amplifier 136 is coupled through a diode D1 to an error bus 138 which provides one input to each of the slices.

The before-mentioned amplifier 118 provides an input to a charge current inverter and error amplifier 140. Amplifier 140 functions to compare the sensed battery charging current to a charge current set point provided by the controller. The amplifier 140 develops an error output that is provided through diode D2 to the error signal bus 138, that is also driven by the voltage error amplifier 136.

A further input to each of the slices is provided from a multiplier 142 that functions to multiply the output of the amplifier 118 by the proportionality constant that is provided by the computer 13. As will be remembered, the proportionality constant indicates the total amount of current that the converter 110 is to provide in a multi-converter system. If the converter 110 is used alone then the proportionality constant, if present, is assumed to be unity.

In accordance with this invention the output of the multiplier 142 is further processed within each of the slices so as to add an indication of the current flowing through the associated inductance. In the illustrated embodiment of FIG. 6 the current through L1 is sensed by a resistance $R_B$ that is connected in series with the boost transistor 128 (it being realized that each of the boost transistors 130–134 is similarly provided with a current sensing resistance). As a result of the use of the resistance $R_B$ the current through L1 is sensed only when the buck transistor 120 is off and the boost transistor 128 is on. The sensed inductor current is scaled with a predetermined scaling factor before being combined by an adder 144 with the signal output from the multiplier 142, it being remembered that the output of the multiplier 142 indicates the proportion of the total bus current that the converter 110 is to supply. By example only, the predetermined scaling factor causes five percent of the inductor current to be added to the output from the multiplier 142. An operational amplifier or resistor divider can be employed for scaling the sensed inductor current that is developed across $R_B$.

In other embodiments of this invention (see, for example, FIG. 8) a low value resistance can be inserted in series with the inductance and a differential amplifier can be connected across the resistance to sense the current, in the manner illustrated for $R_S$ and amplifier 118.

The output of the adder 144 provides a second input to the error amplifier 146, the first input being provided from the combination of the voltage error 136 and the charge current inverter and error amplifier 140. Based on the difference between these two inputs the error amplifier 146 develops pulsewidth modulated signals 146a and 146b for driving the boost transistor 128 and the buck transistor 120, respectively. As in the previously described embodiments, the pulse width modulated signal 146b is the inverse of the pulse width modulated signal 146a.

By example only, the battery voltage may be in the range of approximately 70–130 V, the value of $V_B$ may vary within a range of approximately 130–180V, and each inductance L1–L4 may have a nominal value of 80 microhenries. A suitable value for C1 is 320 microfarads.

Figure 7A:
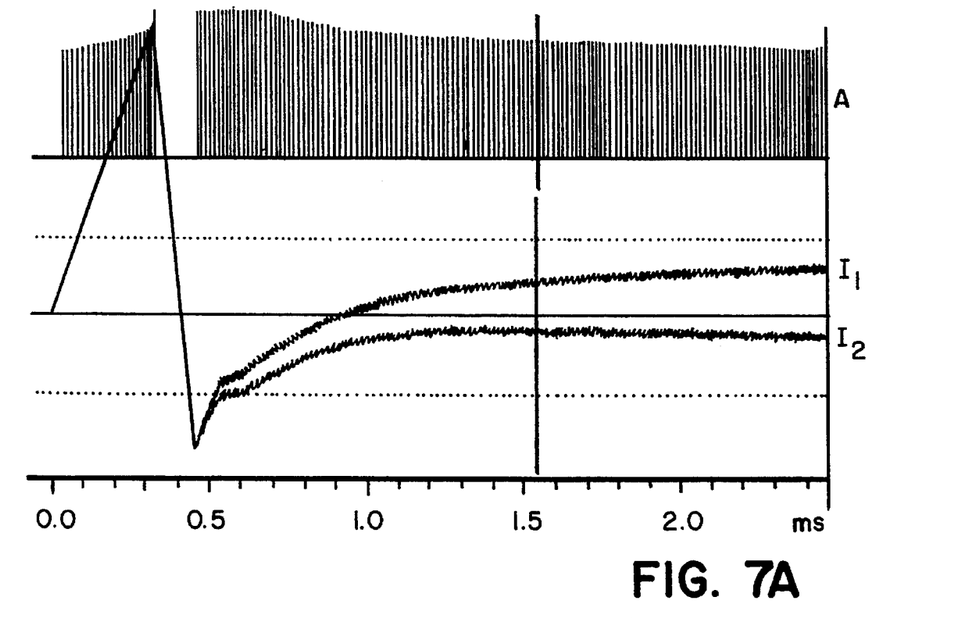
FIGS. 7A and 7B are plots of inductor current with respect to time, and are useful in illustrating the operation of the current-sharing controller of FIG. 6.
Figure 7B:
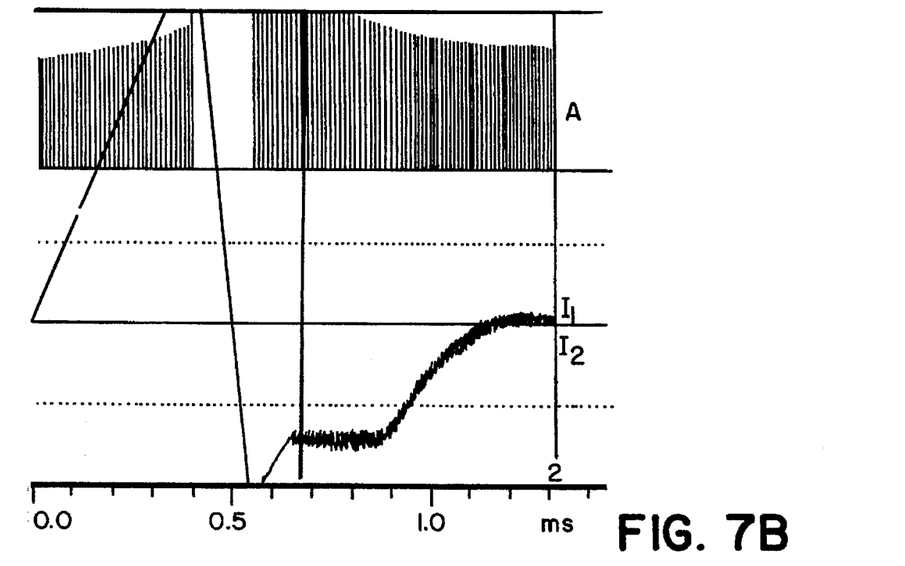

Reference is now made to FIGS. 7A and 7B for illustrating two simulations of a two slice (phase) power converter. FIG. 7A shows the effect of a small difference (1%) in ramp amplitude due to, by example, one of the buck transistors being on for a slightly longer time than the other buck transistor. The trace labeled A corresponds to the node A in FIG. 6 where the drains of the boost and buck transistors are connected to the inductance L1. By example, for a converter operating at 80 kHz, a nominal on time for the buck transistors is approximately 4 microseconds. This simulation assumes that one of the buck transistors remains on instead for 4.125 microseconds. The result, after several hundred cycles of operation, is that the current through the two inductors will diverge as shown by the traces labeled $I_1$ and $I_2$. The magnitude of the current divergence is limited by the resistance of the power path. This divergence in current is undesirable for the reasons discussed previously.

FIG. 7B shows beneficial result of the addition of the current balancing circuit of FIG. 6 which has, in this example, a scaling factor that results in the addition of 4% of the source current to the output of the multiplier 142 of FIG. 6. As can be seen, the divergence of the inductor currents is substantially eliminated, which is the desired result.

The technique of current balancing between phases of an interleaved converter, in accordance with the foregoing description, may be applied to any interleaved (multi-slice) buck-derived or boost-derived PWM power converter that includes at least one inductance. The power converter may be transformer coupled or non-transformer coupled. Examples of suitable power converter topologies that may benefit from the teaching of this invention include, but are not limited to, the buck, boost, push-pull, forward, and bilateral topologies.

Figure 8:
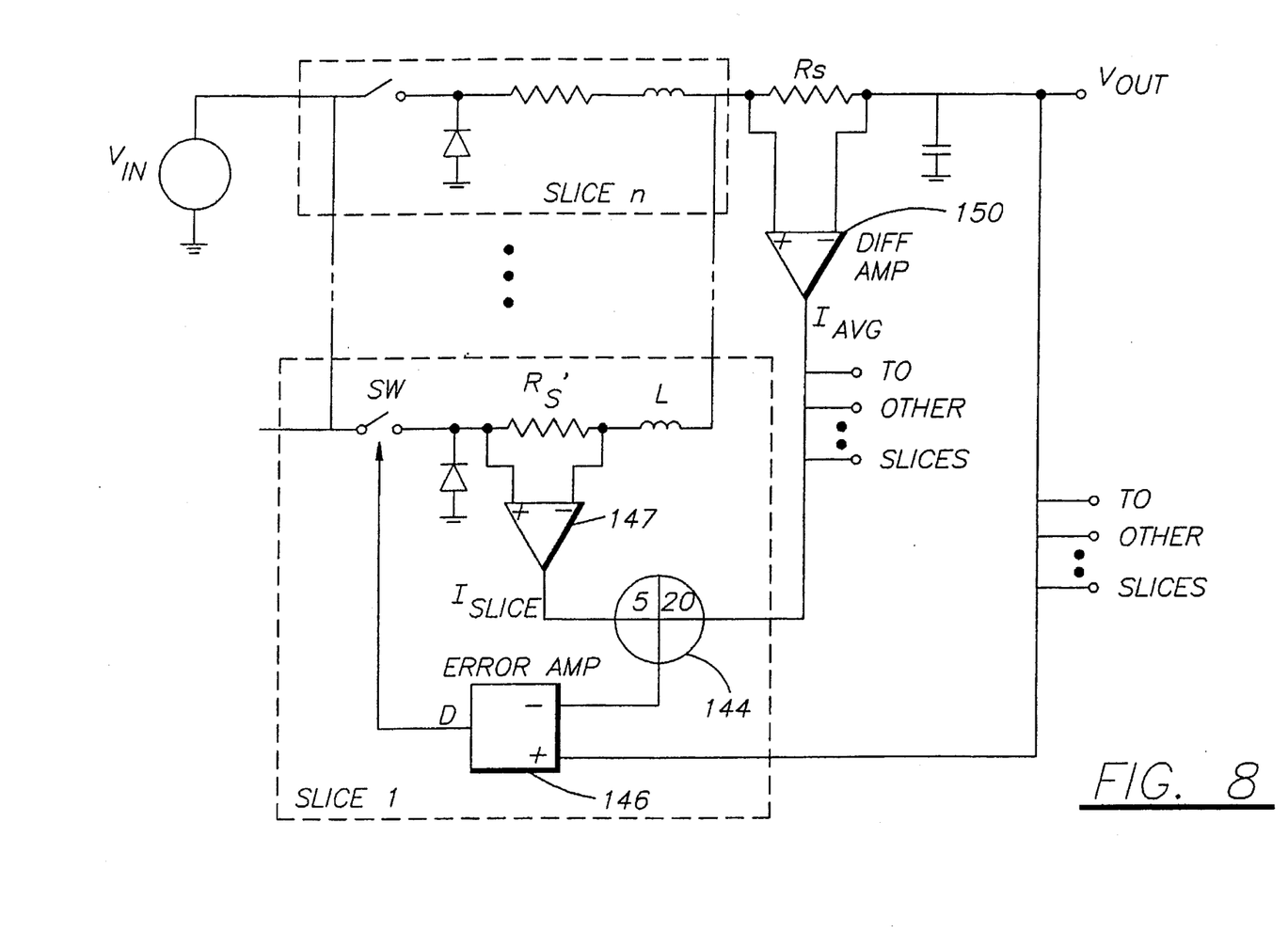
FIG. 8 illustrates a multi-slice buck converter that is constructed in accordance with the teaching of this invention.
Figure 9:
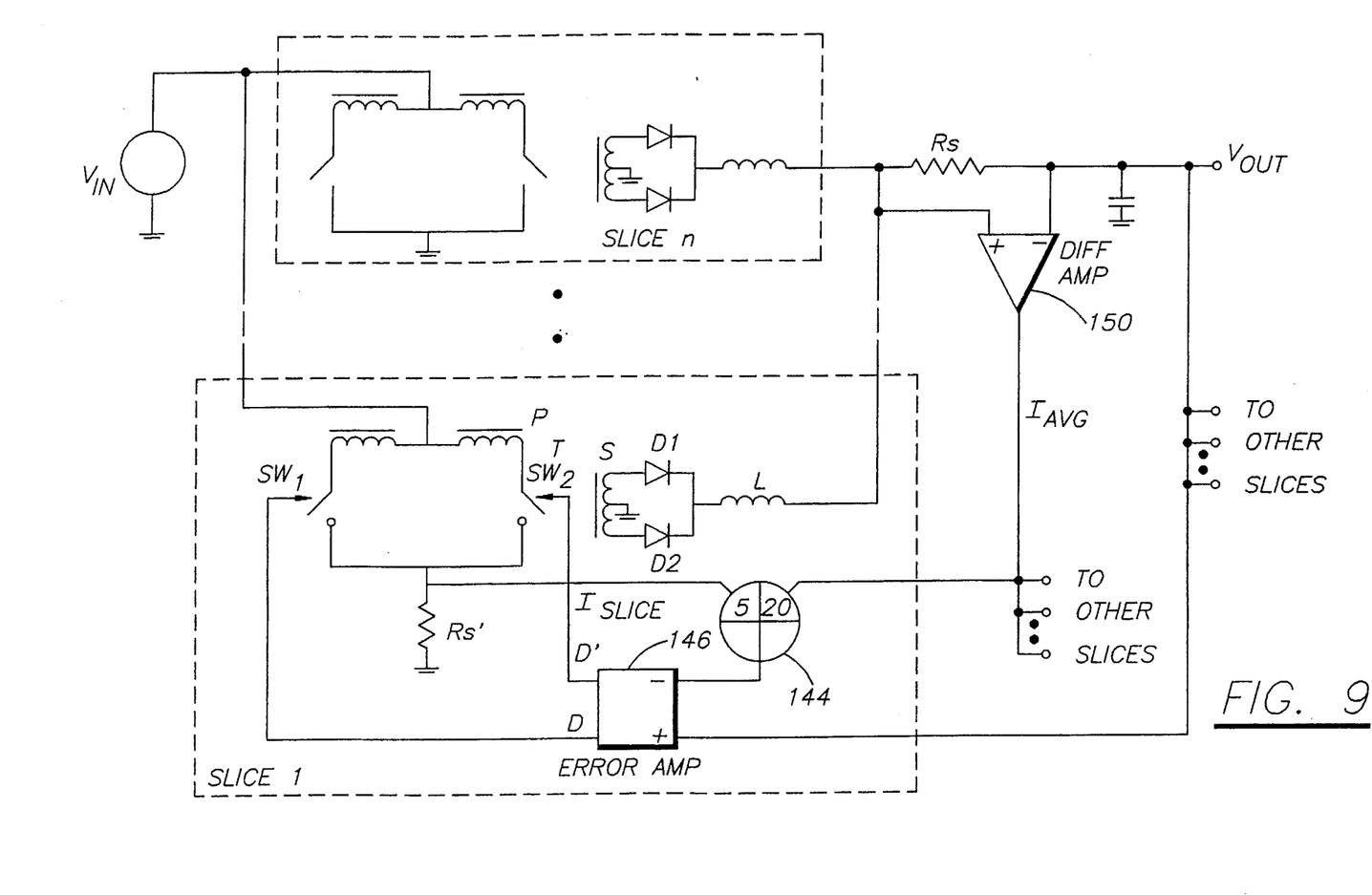
FIG. 9 illustrates a multi-slice push-pull converter that is constructed in accordance with the teaching of this invention.
Figure 10:
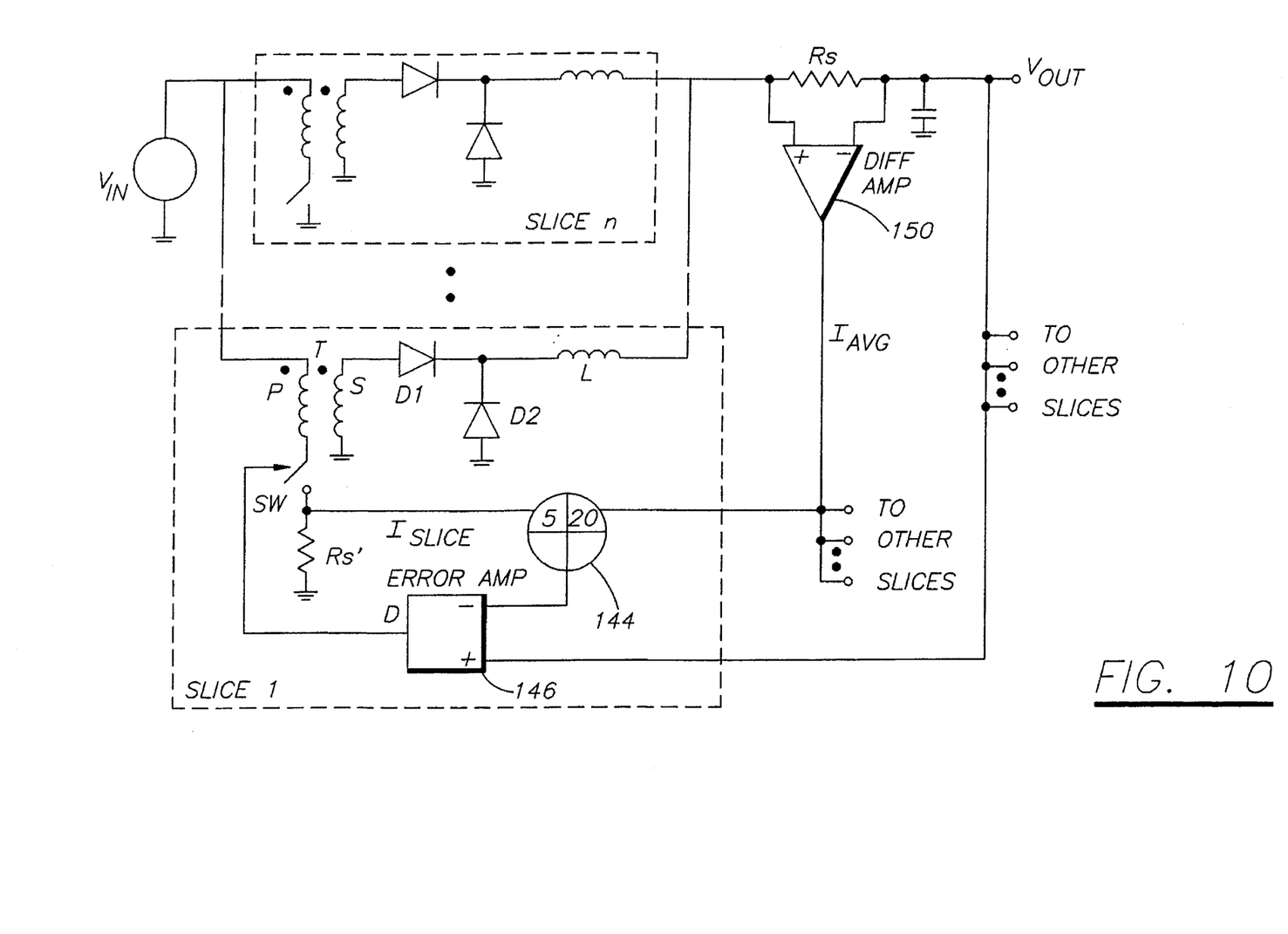
FIG. 10 illustrates a multi-slice forward converter that is constructed in accordance with the teaching of this invention.

To illustrate this fact reference is made now to FIGS. 8, 9 and 10 which illustrate the teaching of this invention as applied to multi-slice buck, push-pull, and forward converters, respectively. Each of these embodiments includes a power bus that is coupled between a power source, illustrated as $V_{IN}$, and a load (not shown).

In FIG. 8 a multi-slice (SLICE 1-SLICE n) buck converter is illustrated. Only SLICE 1 is illustrated in full, it being realized that all slices are constructed in an identical manner. SLICE.1 includes a buck transistor, schematically illustrated as a switch (SW), an inductance L, and a current sensing resistance $R_S'$ connected in series between SW and L. A differential amplifier 147 is connected across $R_S'$ and generates a signal indicative of the peak magnitude of the current provided by the SLICE 1, designated as $I_{SLICE}$. An outer loop differential amplifier 150 is connected across a current sensing resistance $R_S$ and generates a signal indicative of an average magnitude of the total converter current $I_{AVG}$. In each slice a predetermined percentage, for example 5%, of the value of $I_{SLICE}$ is added to $I_{AVG}$ with the adder 144. An error amplifier and PWM 146 receives the output of the adder 144 and also an indication of the magnitude of the voltage being output from the converter ($V_{OUT}$). The difference between these two signals is used to control the pulse width of a signal D that drives the buck transistor (SW).

In FIG. 9 a multi-slice (SLICE i-SLICE n) push-pull converter is illustrated. As in FIG. 8, only the SLICE 1 is illustrated in full, it being realized that all slices are constructed in an identical manner. SLICE 1 includes a pair of switches (SW1, SW2) that are operated 180° out of phase with one another, a transformer T having a primary P and a secondary S, a full wave rectifier comprised of diodes D1 and D2, an inductance L, and a current sensing resistance $R_S'$ connected between SW1, SW2 and ground. A voltage appearing across $R_S'$ provides a signal indicative of the peak magnitude of the current provided by the SLICE 1, designated as $I_{SLICE}$. The outer loop differential amplifier 150 is connected across the current sensing resistance $R_S$ and generates a signal indicative of an average magnitude of the total converter current $I_{AVG}$. In each slice the predetermined percentage, for example 5%, of the value of $I_{SLIDE}$ is added to $I_{AVG}$ with the adder 144. The error amplifier and PWM 146 receives the output of the adder 144 and also the indication of the magnitude of the voltage being output from the converter ($V_{OUT}$). The difference between these two signals is used to control the pulse width of the signals D and D' that drive the transistors SW1 and SW2 in a push-pull (180° out of phase) manner.

In FIG. 10 a multi-slice (SLICE i-SLICE n) forward converter topology is illustrated. As in FIGS. 8 and 9, only the SLICE 1 is illustrated in full, it being realized that all slices are constructed in an identical manner. SLICE 1 includes a transistor switch (SW), a transformer having a primary P and a secondary S, diodes D1 and D2, an inductance L, and a current sensing resistance $R_S'$ connected between SW and ground. As in FIG. 9, the voltage appearing across $R_S'$ provides a signal indicative of the peak magnitude of the current provided by the SLICE 1, designated as $I_{SLICE}$. The outer loop differential amplifier 150 is connected across the current sensing resistance $R_S$ and generates a signal indicative of an average magnitude of the total converter current $I_{AVG}$. In each slice the predetermined percentage, for example 5%, of the value of $I_{SLICE}$ is added to $I_{AVG}$ with the adder 144. The error amplifier and PWM 146 receives the output of the adder 144 and also the indication of the magnitude of the voltage being output from the converter ($V_{OUT}$). The difference between these two signals is used to control the pulse width of the signal D that drives the transistor SW.

In accordance with the teaching of this invention the use of the third current control loop ($R_S'$, differential amplifier 147, adder 144 in FIG. 8 and $R_S'$ and adder 144 in FIGS. 9 and 10) causes the output currents from each of the phases or slices of the power converters to be substantially equalized one to another, thereby eliminating the undesirable divergence of output currents that is illustrated in FIG. 7A.

Although ,this invention has been described with reference to several exemplary embodiments, the above description is intended to illustrate the operation of the preferred embodiments and is not meant to limit the scope of the invention. The scope of the invention is to be delimited only by the following claims. From the above discussion, many variations will be apparent to one skilled in the art that would yet be encompassed by the true spirit and scope of the present invention.

What is claimed is:

1. An interleaved power converter system comprising:

a power bus having a first node coupled to a source of power and a second node coupled to a load; and a plurality N of power converter slices connected in parallel with said power bus for providing current thereto, each of said slices providing approximately $1/N$ of a total amount of current flowing through said power bus, each of said slices comprising, at least one switch coupled to said power bus;

an inductance having a first terminal coupled to said at least one switch and a second terminal coupled to said power bus; and control means having an output for controlling the opening and closing of said at least one switch to control an amount of current that flows through said inductance as a function of a difference between (a) a first signal that represents a magnitude of a voltage potential of said power bus and (b) a second signal that represents a combination of a magnitude of an average current flowing through said power bus and a magnitude of a peak current flowing through the inductance.

2. An interleaved power converter system as set forth in claim 1 wherein each of said N slices is further comprised of:

means for sensing the peak current flowing through said inductance for generating a peak current signal; and means for adding a predetermined percentage of the peak current signal to a signal representing the magnitude of the average current flowing through said power bus, said adding means having an output for providing said second signal.

3. An interleaved power converter system as set forth in claim 2 wherein said predetermined percentage is approximately 5%.

4. An interleaved power converter system comprising:

a power bus having a battery coupled thereto;

a plurality of inductors each of which is switchably coupled between a system ground and said power bus; and a plurality of control means individual ones of which control the switching of an individual one of said inductors as a function of (a) a magnitude of a voltage potential of said power bus; b) a magnitude of an average current flowing through said power bus; and (c) a signal that indicates a magnitude of a peak current flowing through the individual one of the inductors.

5. An interleaved power converter system as set forth in claim 4 wherein one end of each of said inductors is connected to said power bus, and further comprising, for each of said inductors, a boost switch coupled between a second end of said inductor and ground; and a buck switch coupled between said second end of said inductor and said power bus, wherein said control means operates said boost and buck switches so as to controllably open one and close the other.

6. An interleaved power converter system as set forth in claim 5 and further comprising current sensing means coupled to each of said inductors for sensing a magnitude of the peak current flowing through the inductor, wherein said current sensing means includes a resistance that is coupled between said boost switch and ground.

7. An interleaved power converter system as set forth in claim 4 and further comprising current sensing means coupled to each of said inductors for sensing a magnitude of the peak current flowing through the inductor, wherein the magnitude of a current flowing through the inductor is scaled in accordance with a predetermined percentage.

8. An interleaved power converter system as set forth in claim 4 wherein said signal is generated by means for adding a first signal, that indicates a predetermined proportion of the total amount of current that said power converter system is supplying to said power bus, to a second signal, that indicates a predetermined fraction of the magnitude of the current flowing through the inductor.

9. An interleaved power converter system comprising:

a power bus having a battery coupled thereto; and a plurality of slices operating in a phased relationship with one another for causing said battery to source current to said power bus or to sink current from said power bus, each of said slices comprising, an inductor that is switchably coupled between a system ground and said power bus; and control means for controlling the switching of said inductor as a function of (a) a difference between a magnitude of a voltage potential of said power bus and a predetermined voltage potential magnitude; (b) a difference between a magnitude of a current flowing through said power bus and a predetermined current magnitude; and (c) a signal that indicates both of (i) a predetermined proportion of a total amount of current that said power converter system is supplying and, (ii) a magnitude of a current flowing through the inductor.

10. An interleaved power converter system as set forth in claim 9 wherein one end of said inductor is connected to said power bus, and further comprising, a boost switch coupled between a second end of said inductor and ground; and a buck switch coupled between said second end of said inductor and said power bus, wherein said control means operates said boost and buck switches so as to controllably open one and close the other.

11. An interleaved power converter system as set forth in claim 10 and further comprising current sensing means coupled to said inductor for sensing a magnitude of a peak current flowing through the inductor, wherein said current sensing means includes a resistance that is coupled between said boost switch and ground.

12. An interleaved power converter system as set forth in claim 10 and further comprising current sensing means coupled to said inductor for sensing a magnitude of a peak current flowing through the inductor, wherein said current sensing means includes a resistance that is coupled in series with said inductor.

13. An interleaved power converter system as set forth in claim 9 and further comprising current sensing means coupled to said inductor for sensing a magnitude of a peak current flowing through said inductor, wherein the magnitude of the peak current flowing through said inductor is scaled in accordance with a predetermined percentage.

14. An interleaved power converter system as set forth in claim 9 wherein said signal is generated by means for adding a first signal, that indicates the predetermined proportion of the total amount of current that said power converter system is supplying, to a second signal, that indicates a predetermined fraction of the magnitude of a peak current flowing through the inductor.

15. A satellite comprising:

a power bus having a battery coupled thereto;

at least one solar array coupled to said power bus; and an interleaved bilateral power converter system comprised of a plurality of slices operating in a phased relationship with one another for causing said battery to source current to said power bus or to sink current from said power bus, each of said slices comprising, an inductor that is switchably coupled between a system ground and said power bus; and control means for controlling the switching of said inductor as a function of (a) a difference between a magnitude of a voltage potential of said power bus and a predetermined voltage potential magnitude; (b) a difference between a magnitude of an average current flowing through said power bus and a predetermined current magnitude; and (c) a signal that indicates both of (i) a predetermined proportion of a total amount of current that said power converter system supplying and, (ii) a magnitude of a peak current flowing through the inductor.

16. A satellite as set forth in claim 15 wherein one end of said inductor is connected to said power bus, and further comprising a boost switch coupled between a second end of said inductor and ground; and a buck switch coupled between said second end of said inductor and said power bus, wherein said control means operates said boost and buck switches so as to controllably open one and close the other.

17. A satellite as set forth in claim 16 and further comprising current sensing means coupled to said inductor for sensing a magnitude of the peak current flowing through the inductor, wherein said current sensing means includes a resistance that is coupled between said boost switch and ground.

18. A satellite as set forth in claim 16 and further comprising current sensing means coupled to said inductor for sensing a magnitude of the peak current flowing through the inductor, wherein said current sensing means includes a resistance that is coupled in series with said inductor.

19. A satellite as set forth in claim 15 and further comprising current sensing means coupled to said inductor for sensing a magnitude of the peak current flowing through said inductor, wherein the magnitude of the peak current flowing through said inductor is scaled in accordance with a predetermined percentage.

20. A satellite as set forth in claim 15 wherein said signal is generated by means for adding a first signal, that indicates the predetermined proportion of the total amount of current that said power converter system is supplying, to a second signal, that indicates a predetermined fraction of the magnitude of the peak current flowing through the inductor.

* * * * *